April 18, 1944.    G. DEAKIN    2,346,910
SERVICE METER AND RELAY FOR TELECOMMUNICATION SYSTEMS
Filed Jan. 19, 1942
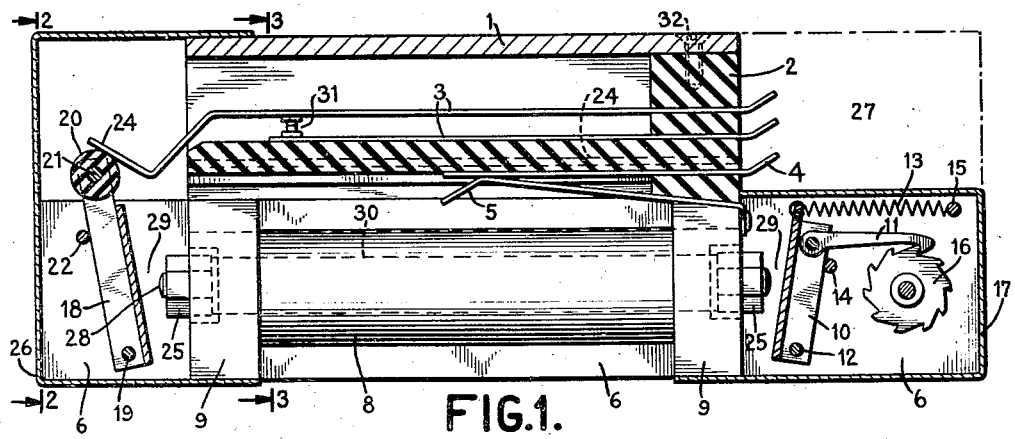
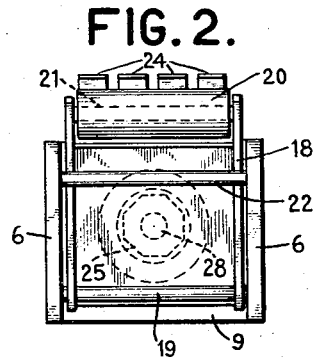
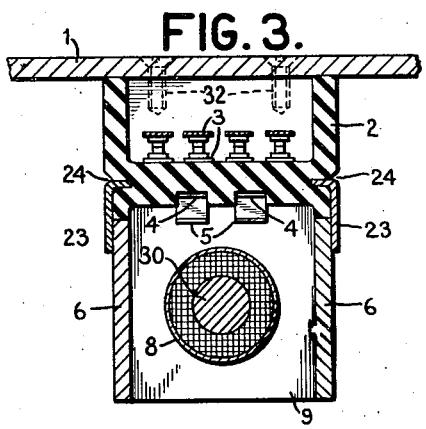
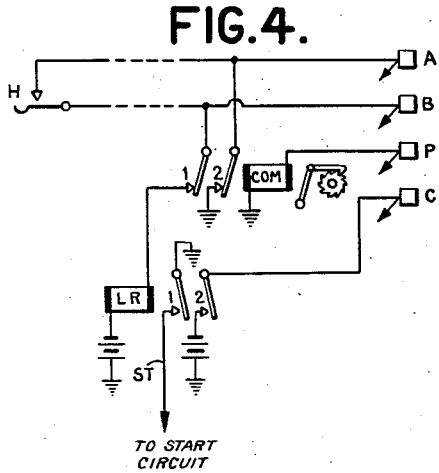
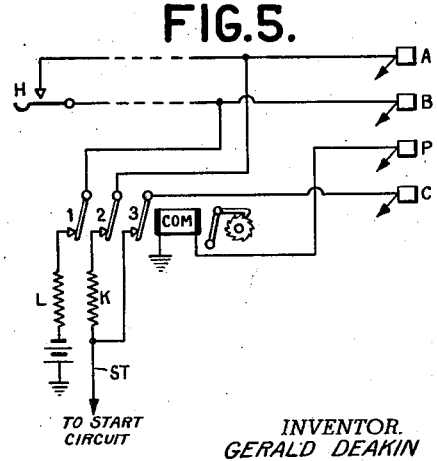
INVENTOR.
GERALD DEAKIN
BY
ATTORNEY.

Patented Apr. 18, 1944

2,346,910

UNITED STATES PATENT OFFICE 2,346,910

SERVICE METER AND RELAY FOR TELECOMMUNICATION SYSTEMS

Gerald Deakin, New York, N. Y., assignor to International Standard Electric Corporation, New York, N. Y., a corporation of Delaware Application January 19, 1942, Serial No. 427,304

9 Claims. (Cl. 179—8)

This invention relates to telecommunication systems and apparatus and more particularly to a construction of combined service meter and relay and to subscribers' line circuits incorporating a combined service meter and relay in automatic and semi-automatic telephone and like systems.

An object of the invention is the provision of a simple and reliable combined service meter and relay. In accordance with a proposed embodiment of the invention a service meter may, for example, be constructed to respond marginally to two values of operating potential so as to perform the functions ordinarily performed by the cut-off relay in automatic or semi-automatic telephone systems as well as the normal metering function. Such a unit permits the momentary use of higher than normal potentials for operating the counting or call metering mechanism, thus allowing the normal potential to be used for operating the cut-off springs with ample margin.

A further object of the invention is, therefore, the provision of a subscriber's line circuit comprising a service meter provided with contact springs which perform the functions usually performed by the contact springs of the conventional cut-off relay.

The above and other objects and features of my invention will be more fully understood from a reading of the following description taken in conjunction with the attached drawing, in which Fig. 1 is a side elevation partly in section of a structure according to one embodiment of my invention;

Fig. 2 is an end elevation of the structure shown in Fig. 1 looking from the left;

Fig. 3 is a sectional elevation on the line 3—3 of Fig. 1; and

Figs. 4 and 5 are circuit diagrams showing two examples of subscribers' line circuits according to my invention.

Referring first to Figs. 1 to 3, these figures show a proposed construction of combined service meter and cut-off relay in which 1 is a mounting plate to which is attached by screws 32 a molded contact spring support 2, into which are molded or otherwise secured four sets of springs 3 and two contact springs 4 adapted to make contact with the two spool springs 5 when the spool and armature unit is slid into position, as will be described subsequently. A molded spring support 2 is provided for each meter and relay unit, and it is contemplated that a mounting plate 1 with ten molded supports 2 and spring groups will be assembled as a unit, and the ten magnet structures each comprising a magnet spool, counting mechanism and relay armature also constructed and adjusted as a separate unit and then slid into position on the mounting, no wiring or soldering being necessary.

The magnet assembly comprises two side return pole pieces 6, as is customary in standard service meter design, to which are secured the two spool heads 9 of the magnet spool 8. The spool heads 9 may be secured to the pole pieces 6 in any convenient manner not shown in the drawing. At one end of the spool 8 is located an armature 10 which is pivoted to the side pole pieces 6 by means of a pivot pin 12. A pawl 11 pivoted at the top of the armature 10 and co-operating with a ratchet 16 is adapted to actuate counting mechanism, which may be of any known and suitable type. A spring 13 attached to the armature 10 retains the latter in its normal position resting against a pin 14 which is attached to the side pole pieces 6, as is also a pin 15 to which the aforementioned spring 13 is also attached. A dust-tight cover 17 is adapted to slip over the metering mechanism and is provided with a window (not shown) through which the number wheels may be read.

At the other end of the magnet assembly a relay armature 18 is mounted on a pivot 19 attached to the side pole pieces 6. A roller 20 formed of insulating material is mounted on a pivot 21 at the top of the armature 18. Normally, the armature 18 rests against a pin 22 attached to the side pole pieces 6 and is held in this position by the bent ends 24 of the upper members of the cut-off spring pairs 3 which are provided with contacts 31.

The magnet assembly comprising the magnet spool 8, armatures 10 and 18, and the counting mechanism 16, slides into the molded spring support 2 from the rear. Flanges 23, which are welded or otherwise attached to the pole pieces 6, engage in slots 24 formed in the molding 2 which, as already stated, is attached to the main support 1. The magnet unit is adjusted to operating limits before being slid into position. The air gaps 29 may be adjusted by rotation of the octagonal threaded magnet core extensions 25. These extensions 25 are threaded onto the magnet core 30, and space in the spool heads 9 is provided so that they may move backward or forward as required.

After adjustment, the magnet assembly is slid into position and connection between the coil winding and the wiring terminals is automatically made by springs 4 and springs 5, the latter springs being attached to the front spool head 9. The dimensions of the fixed unit and the spool assembly are made such that the roller 20 on the relay armature 19 just makes or almost makes contact with the ends 24 of the cut-off springs 3, but the contacts 31 mounted on the cut-off springs are not broken. The arrangement permits the magnet unit to be placed in position or removed without unsoldering or otherwise disconnecting any wires. A cap or cover 26 is slid into position over the left-hand end of the structure after the magnet assembly is in position, and protects the spring contacts and the relay armature from dust.

As already stated, it is contemplated that the combined units will be mounted in strips of ten with a suitable terminal strip for outside cabling at one end. The space 27 shown enclosed in broken lines in Fig. 1 may conveniently accommodate the wiring to this common terminal strip.

The relay armature 18 will be adjusted to operate, for example, on 24 volts and when attracted will rest against the stop pin 28 provided in the adjacent core extension 25. The counting mechanism armature 10 will be adjusted to operate on, say 80 volts when the relay armature 18 is attracted. It will release when the normal potential of 24 volts is restored, thus permitting the combined unit to be used for multiple metering without releasing the relay armature 18. The adjustments are effected by variation of the air-gaps 29 and by the choice of suitable tensions for the spring 13 and for the contact springs which are engaged by the roller 20.

Fig. 4 shows one application of a combined service meter and cut-off relay in a subscriber's line circuit of the kind provided with the usual line relay LR and forming part of a known type of automatic or semi-automatic telephone system, as disclosed, for example, in British Patent No. 141,080, in which a calling line is picked up by an idle line finder provided with four brushes.

When the subscriber removes his receiver, the line relay LR is energized over the switch hook contacts H, the subscriber's loop circuit and contacts 1 and 2 of the combined service meter and cut-off relay COM. At contacts 1 line relay LR grounds the start circuit ST and at contacts 2 connects battery to the test terminals C in the banks of the line finders. The grounding of the start circuit ST causes an idle line finder to hunt for the calling line in known manner, and when the calling line is seized, battery is connected to private wire terminal P, thereby energizing the combined service meter and cut-off relay COM to such an extent that the relay armature opens contacts 1 and 2, but the counting mechanism is not actuated. The line relay LR is disconnected from the subscriber's line wires and relapses. When it is required to meter the call, metering battery potential will be applied to the private wire terminal P, for example, from a link circuit, as disclosed in British Patent 141,080, thereby causing the combined service meter and cut-off relay to operate fully and actuate the counting mechanism.

Fig. 5 shows how a combined service meter and cut-off relay may be employed in a subscriber's line circuit of the kind described in my copending United States application Serial No. 286,220, filed July 24, 1939, in which the usual line relay is omitted, and instead a pair of resistors K and L are normally connected to the $a$ and $b$ wires of the subscriber's line circuit. The resistor L is connected to battery and a start circuit continuously tests the free ends ST of the resistors K of a group of subscribers' lines, as disclosed in my copending application above referred to.

Upon closure of the subscriber's loop at switch hook contacts H, negative potential is applied to the start circuit over resistor L, contacts 1 of the combined service meter and cut-off relay COM, the subscriber's loop, contacts 2 of COM and resistor K. An idle line finder is thereby caused to hunt for the calling line and when it arrives on the terminals A, B, P, C, ground is placed on the terminal C as described in the copending application mentioned above. The line finder relay designated R in this copending application, will be provided with additional contacts over which the normal exchange battery voltage is connected to the private wire terminal P, thereby causing the relay armature of the combined service meter and cut-off relay COM to open the contacts 1, 2, and 3, but the counting mechanism is not actuated. At contacts 1 and 2 the resistors K and L are disconnected from the line wires and at contact 3 the lower end of resistor K is disconnected from the test terminal C, thus holding the calling line busy.

When a connection has been set up to a wanted subscriber's line, metering battery potential will be applied to the private wire terminal P, for example, from a link circuit or register in any known manner, thereby causing the combined service meter and cut-off relay COM to attract its meter armature and actuate the counting mechanism. Upon removal of the metering battery, the armature which actuates the counting mechanism will restore, but the armature which opens the contacts 1, 2 and 3 will remain attracted.

Since the resistors K and L are not connected to the line wires during selection and conversation, they may be reduced to any convenient value. By using resistors of reduced value, it is possible to adjust the common start circuit so that it will not indicate a line as being in a calling condition in response to a loop circuit or leak of a resistance higher than may be held by the supervisory or dialing relays in the talking connection switches or register circuits. This will reduce the number of false calls. Moreover, since the combined service meter and cut-off relay when functioning as a cut-off relay opens at contacts 3 the test conductor extending to test terminal C, ground applied to terminal C by a line finder or connector will not affect the start circuit. It is unnecessary, therefore, to insert in the start circuit conductor ST a guard resistor such as J shown in my copending application referred to above.

It will be noted that in the line circuit arrangements of Figs. 4 and 5, only two and three spring sets respectively are required on the combined service meter and cut-off relay. In other applications, however, it may be necessary to use four spring sets, as shown in the constructional embodiment illustrated in Figs. 1 to 3 or an even greater number.

Although certain embodiments of the invention have been shown and described for the purpose of illustration, it will be understood that modifications and adaptations thereof occurring to those skilled in the art may be made without departing from the scope of the invention as defined in the appended claims.

What I claim is:

1. In an automatic or semi-automatic telecommunication exchange system, a subscriber's line, electrical contacts over which said line is normally connected to component apparatus at the exchange, an electromagnet individual to said subscriber's line, call metering mechanism, means responsive to a predetermined energization of said magnet for opening said contacts and means responsive to a greater predetermined energization of said magnet for actuating said call metering mechanism.

2. A system according to claim 1 wherein said magnet individual to said subscriber's line comprises a magnet core and a winding on said core, and wherein said second-mentioned means comprises a first armature pivotally mounted adjacent one end of said core for actuating said counting mechanism and said first-mentioned means comprises a second armature pivotally mounted adjacent the other end of said core for actuating said electrical contacts.

3. In an automatic or semi-automatic telecommunication system, a subscriber's line, electrical contacts individual to said subscriber's line, a line relay having a winding normally connected to a subscriber's line conductor over said electrical contacts, an electromagnet and a counting mechanism individual to said subscriber's line, means responsive to a predetermined energization of said magnet for opening said contacts and means responsive to a predetermined greater energization of said magnet for actuating said counting mechanism.

4. A system according to claim 3 wherein said magnet is provided with a single winding connected at one end to a conductor individual to said subscriber's line and at the other end to a common return point.

5. In an automatic or semi-automatic telecommunication system, a subscriber's line comprising a first and a second line conductor, a subscriber's station connected to said line and including means for closing a loop connection between said line conductors to initiate a call, a line finder start circuit, at least two pairs of normally closed electrical contacts and first and second ohmic resistances individual to said subscriber's line, the first resistance having one end connected over a pair of said normally closed contacts to said first line conductor and the other end permanently connected to a common return point and the said second resistance having one end connected over another pair of normally closed contacts to said second line conductor and the other end connected to said line finder start circuit, an electromagnet and a counting mechanism individual to said subscriber's line, means responsive to a predetermined energization of said magnet for opening said contacts, and means responsive to a greater predetermined energization of said magnet for actuating said counting mechanism.

6. A system according to claim 5 further comprising a connection from said other end of said second ohmic resistance over further normally closed contacts to a test conductor individual to said subscriber's line and means responsive to said predetermined energization of said magnet for opening said further contacts.

7. A combined service meter and relay comprising a core, a winding on said core, a pair of side return pole pieces extending beyond the ends of said core, a counting mechanism, a set of contact springs, a first armature pivotally mounted between said pole pieces adjacent one end of said core for actuating said counting mechanism responsive to a predetermined energization of said winding and a second armature pivotally mounted between said pole pieces adjacent the other end of said core for actuating said contact springs responsive to a predetermined lesser energization of said winding.

8. A combined service meter and relay comprising a mounting plate, a spring set mounted on a support, means for securing said support to said mounting plate, a magnet assembly including a magnet, counting mechanism, a first armature adjacent one end of said magnet for actuating said counting mechanism, a second armature adjacent the other end of said magnet, and means for detachably securing said magnet assembly to said spring set support, said spring set and said second armature being so arranged that they enter into cooperative relation when said magnet assembly is mounted in position on said spring set support.

9. A combined service meter and relay according to claim 8 in which said magnet assembly further comprises a pair of side return pole pieces provided with projecting flanges adapted to slide in grooves provided in said spring set support.

GERALD DEAKIN.